(12) United States Patent
Tsuji (10) Patent No.: US 11,144,797 B2
(45) Date of Patent: Oct. 12, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Ryosuke Tsuji, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 192 days.

(21) Appl. No.: 16/456,890

(22) Filed: Jun. 28, 2019

(65) Prior Publication Data
US 2020/0005101 A1    Jan. 2, 2020

(30) Foreign Application Priority Data

Jul. 2, 2018    (JP) .............................. JP2018-126359

(51) Int. Cl.
*G06K 9/00*    (2006.01)
*G06K 9/68*    (2006.01)
(Continued)

(52) U.S. Cl.
CPC ....... *G06K 9/6807* (2013.01); *G06K 9/00342* (2013.01); *G06K 9/00369* (2013.01);
(Continued)

(58) Field of Classification Search
CPC ............. G06K 9/6807; G06K 9/00342; G06K 9/00369; G06T 7/11; G06T 2207/20081; G06T 2207/20084
(Continued)

(56) References Cited

U.S. PATENT DOCUMENTS 5,901,255 A *  5/1999  Yagasaki .............. G06K 9/6807
                                                  382/310
8,073,200 B2 * 12/2011  Oi ............................ G06T 7/70
                                                  382/103
(Continued)

FOREIGN PATENT DOCUMENTS

JP    2005-318554 A    11/2005
JP    2015-005237 A     1/2015

OTHER PUBLICATIONS

Alex Krizhevsky et al. "ImageNet Classification with Deep Convolution Neural Networks, Advances in Neural Information Processing Systems" 25 (NIPS '12), 2012.

*Primary Examiner* — Jonathan S Lee
(74) *Attorney, Agent, or Firm* — Cowan, Liebowitz & Latman, P.C.

(57) ABSTRACT

An image processing apparatus comprises a detection circuit that, by referencing dictionary data acquired by machine learning corresponding to a target photographic subject to be detected in an obtained image, detects the target photographic subject; a selection unit that selects one of a plurality of dictionary data items corresponding to the target photographic subject; and a control circuit that, in a case where a detection evaluation value in a case where the photographic subject is detected by using the dictionary data selected by the selection unit is lower than a predetermined value, controls the detection circuit to detect the target photographic subject by using the selected dictionary data and dictionary data different to the selected dictionary data.

19 Claims, 7 Drawing Sheets

(51) Int. Cl.
  *G06K 9/62* (2006.01)
  *G06T 7/11* (2017.01)
(52) U.S. Cl.
  CPC .............. *G06K 9/6255* (2013.01); *G06T 7/11* (2017.01); *G06T 2207/20081* (2013.01); *G06T 2207/20084* (2013.01)
(58) Field of Classification Search
  USPC ......................................................... 382/103
  See application file for complete search history.

(56) References Cited

U.S. PATENT DOCUMENTS

| | | | |
|---|---|---|---|
| 8,903,131 B2* | 12/2014 | Aomi | G06K 9/00671 382/103 |
| 9,008,438 B2* | 4/2015 | Kawanishi | G06F 16/51 382/195 |
| 9,165,181 B2* | 10/2015 | Maeda | G06K 9/00744 |
| 9,773,322 B2* | 9/2017 | Uchiyama | G06T 7/74 |
| 10,176,382 B1* | 1/2019 | Owechko | G06K 9/6289 |
| 2016/0004935 A1* | 1/2016 | Uchiyama | G06T 7/74 382/155 |

* cited by examiner

| ID | DICTIONARY DATA | PHOTOGRAPHIC SUBJECT EXAMPLE |
|---|---|---|
| 1 | GENERAL PURPOSE |  |
| 2 | SPECIFIC POSTURE |  |
| 3 | OVERLAPPING |  |
| 4 | LARGE NUMBER |  |
| 5 | DECORATION |  |

IMAGE PROCESSING APPARATUS, IMAGE PROCESSING METHOD, AND STORAGE MEDIUM

BACKGROUND OF THE INVENTION

Field of the Invention

The present invention is related to an image processing apparatus that has an object detection function.

Description of the Related Art

An image processing method in which a specific photographic subject pattern is automatically detected in an image is an extremely useful technique since it can identify a facial region of a human, for example, in an image and the like. As disclosed in Japanese Patent Laid-Open No. 2005-318554, in an image capturing apparatus such as a digital camera or a digital video camera, a region of a specific photographic subject pattern such as a facial region of a person is detected in a captured image, and a focal point and exposure are optimized for the detected region.

Also, there is a method called deep learning such as is disclosed in D1 (Alex Krizhevsky, Ilya Sutskever, Geoffrey E. Hinton, ImageNet Classification with Deep Convolution Neural Networks, Advances in Neural Information Processing Systems 25 (NIPS '12), 2012) for learning/recognizing a photographic subject in an image. As a representative method for deep learning, there is a method called convolutional neural network (hereinafter "CNN"). A typical CNN consists of multi-level operations. In each level of the CNN, local features of an image are spatially integrated by performing a convolution operation, and the result is inputted into a neuron of an intermediate layer of the next level. Furthermore, an operation for compressing feature amounts spatially that is referred to as pooling and sub-sampling is performed. A CNN can acquire a complicated feature representation through such multi-level feature conversion. Therefore, it is possible to perform, at high-accuracy, photographic subject category recognition and subject detection in an image based on feature amounts. In machine learning as typified by a CNN, image signals and supervisory signals are learned as a set. As the result of learning, dictionary data which is a subject detection processing parameter is generated.

In a case where photographic capturing is performed, photographic subject characteristics may differ depending on a capturing scene. Photographic subject characteristics as used herein are differences in how a person appears in the case where the photographic subject is a person, and are characteristics that have an effect on detection difficulty such as a posture of a person, overlapping of people, and the like. Dictionary data is learned for every photographic subject characteristic, and by using, in detection processing, dictionary data that is specialized for a predetermined photographic subject, it is possible to enhance the detection accuracy.

Accordingly, to improve photographic subject detection accuracy, a method that uses dictionary data of an appropriate photographic subject characteristic, by switching in accordance with the situation, can be considered. In Japanese Patent Laid-Open No. 2015-5237, for a plurality of distance ranges set in accordance with a distance from an image capturing apparatus to a photographic subject, learned feature amounts are stored for each distance range, learned feature amounts and photographic subject feature amounts are compared, and thereby a photographic subject is detected. Publicly known techniques regarding switching dictionaries for subject detection exist, but there is no disclosure of switching dictionary data for different photographic subject characteristics. Also, in a method that uses dedicated dictionary data that accords to photographic subject characteristics, there are cases in which detection accuracy is lower than with general-purpose dictionary data in a case of specific photographic subject characteristics at the time of capturing.

SUMMARY OF THE INVENTION

The present invention was made in light of the foregoing problems, and improves accuracy in subject detection by machine learning.

According to a first aspect of the present invention, there is provided an image processing apparatus comprising: at least one processor or circuit configured to function as the following units: an analysis unit configured to select one among a plurality of dictionary data items, and by using the selected dictionary data, to perform analysis of an obtained image, wherein the plurality of dictionary data items includes at least first dictionary data and second dictionary data, and the analysis unit, even in a case where a detection score for the photographic subject obtained using the first dictionary data is lower than a threshold or the photographic subject cannot be detected using the first dictionary data, performs image analysis again by using the first dictionary data, and in a case where a detection score for the photographic subject obtained using the second dictionary data is lower than a threshold or the photographic subject cannot be detected using the second dictionary data, performs image analysis again by using dictionary data different to the second dictionary data.

According to a second aspect of the present invention, there is provided an image processing apparatus comprising: at least one processor or circuit configured to function as the following units: a detection unit configured to, by referencing dictionary data acquired by machine learning corresponding to a target photographic subject to be detected in an obtained image, detect the target photographic subject; a selection unit configured to select one of a plurality of dictionary data items corresponding to the target photographic subject; and a control unit configured to, in a case where a detection evaluation value in a case where the photographic subject is detected by using the dictionary data selected by the selection unit is lower than a predetermined value, control the detection unit to detect the target photographic subject by using the selected dictionary data and dictionary data different to the selected dictionary data, wherein the plurality of dictionary data items include general purpose dictionary data and a plurality of dedicated dictionary data items, and each of the plurality of dedicated dictionary data items are dictionary data for which, in a case where the target photographic subject is in a condition respectively corresponding to the dedicated dictionary data, a probability that it is possible to detect the target photographic subject is higher than with the general purpose dictionary data, and the general purpose dictionary data is dictionary data by which it is possible to detect the target photographic subject in more conditions than with each of the plurality of dedicated dictionary data items.

According to a third aspect of the present invention, there is provided an image processing method comprising: selecting one among a plurality of dictionary data items, and by using the selected dictionary data, performing analysis of an obtained image, wherein the plurality of dictionary data items includes at least first dictionary data and second dictionary data, and even in a case where a detection score for the photographic subject obtained using the first dictionary data is lower than a threshold or the photographic subject cannot be detected using the first dictionary data, image analysis is performed again by using the first dictionary data, and in a case where a detection score for the photographic subject obtained using the second dictionary data is lower than a threshold or the photographic subject cannot be detected using the second dictionary data, image analysis is performed again by using dictionary data different to the second dictionary data.

According to a fourth aspect of the present invention, there is provided an image processing method comprising: by referencing dictionary data acquired by machine learning corresponding to a target photographic subject to be detected in an obtained image, detecting the target photographic subject; selecting one of a plurality of dictionary data items corresponding to the target photographic subject; and in a case where a detection evaluation value in a case where the photographic subject is detected by using the dictionary data selected by the selecting is lower than a predetermined value, controlling the detecting to detect the target photographic subject by using the selected dictionary data and dictionary data different to the selected dictionary data, wherein the plurality of dictionary data items include general purpose dictionary data and a plurality of dedicated dictionary data items, and each of the plurality of dedicated dictionary data items is dictionary data for which, in a case where the target photographic subject is in a condition respectively corresponding to the dedicated dictionary data, a probability that it is possible to detect the target photographic subject is higher than with the general purpose dictionary data, and the general purpose dictionary data is dictionary data by which it is possible to detect the target photographic subject in more conditions than with each of the plurality of dedicated dictionary data items.

Further features of the present invention will become apparent from the following description of exemplary embodiments with reference to the attached drawings.

DESCRIPTION OF THE EMBODIMENTS

Explanation in detail is given below with reference to the attached drawings, regarding embodiments of the present invention. Note that the following embodiments of the present invention are for illustrating advantageous forms of the invention and do not limit the scope of the present invention. In the following embodiments, description is given using an example of a digital single lens reflex camera, but a mirrorless camera, a video camera, a monitoring camera, a smart phone with a camera function, or the like, comprising a function for detecting a photographic subject that is made to be a target may also be used. Also, it is possible to apply the present invention in a case where processing for detecting the photographic subject that is made to be the target is executed in a personal computer, a cloud computer, or an edge computer after receiving a moving image captured by such a camera.

(Configuration of Image Capturing Apparatus)

Figure 1:
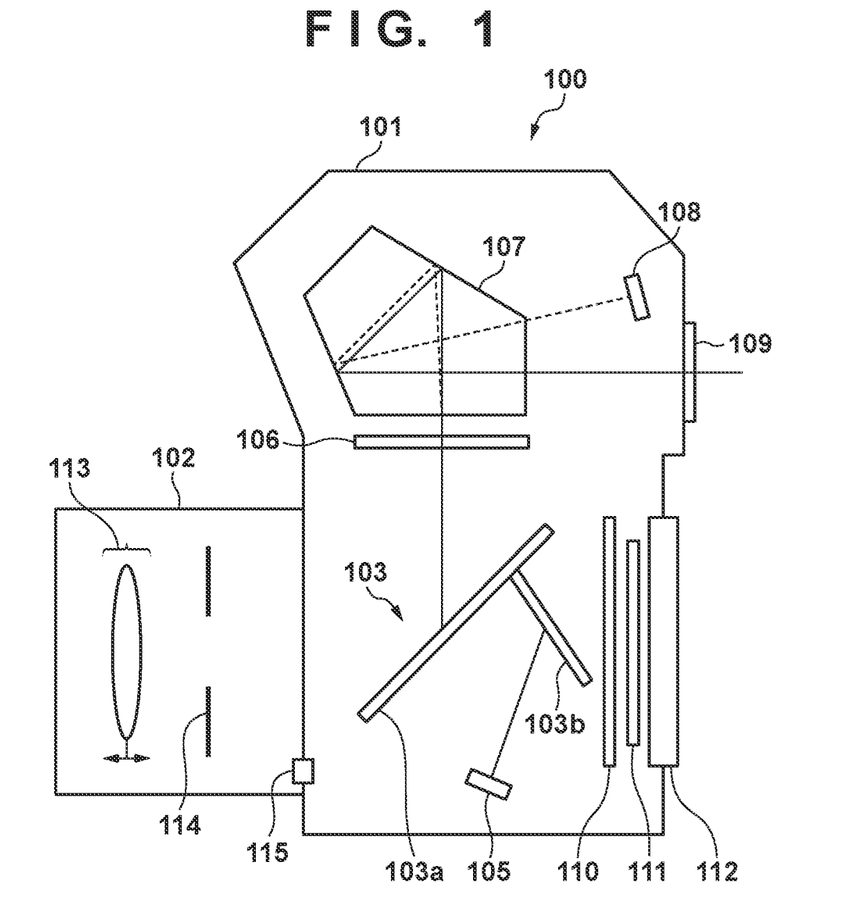
FIG. 1 is a side sectional view of a digital single lens reflex camera which is an embodiment of an image processing apparatus of the present invention.
Figure 2:
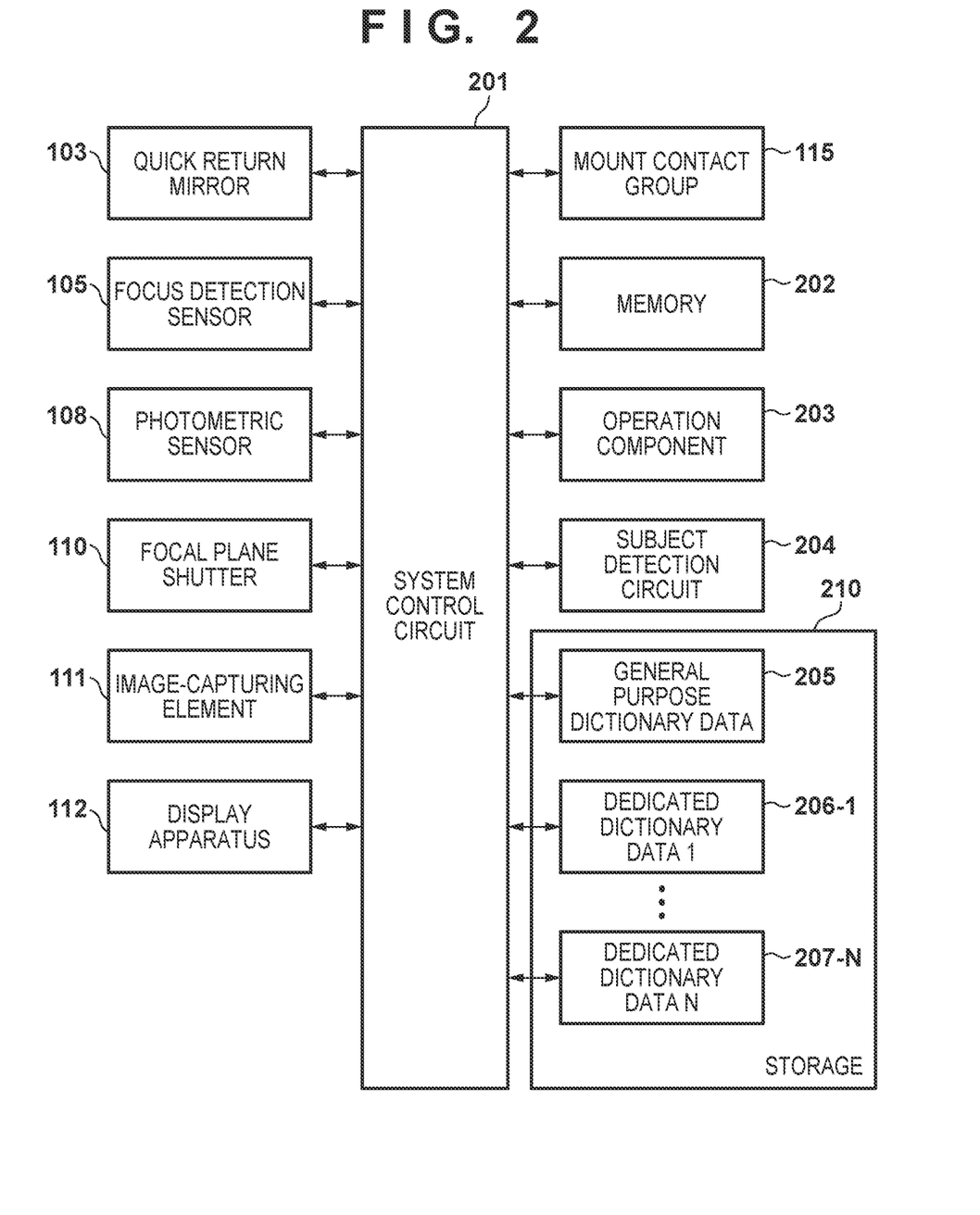
FIG. 2 is a view illustrating a block configuration of the digital single lens reflex camera.

FIG. 1 is a side sectional view of a digital single lens reflex camera 100 which is an embodiment of the image processing apparatus of the present invention, and FIG. 2 is a view illustrating a block configuration of the digital single lens reflex camera 100.

In FIG. 1, the digital single lens reflex camera 100 is configured to comprise a camera body 101 and an image capturing lens 102 that is mounted detachably to the camera body 101. Also, in FIG. 2, the camera body 101 comprises a system control circuit 201 that controls the digital single lens reflex camera 100 on the whole. To the system control circuit 201, a quick return mirror 103, a focus detection sensor 105, a photometric sensor 108, a focal plane shutter 110, an image-capturing element 111, a display apparatus 112, and a mount contact point group 115, which are described later, are connected. Also, to the system control circuit 201, a memory 202, an operation component 203, a subject detection circuit 204, and a storage 210 in which dictionary data is stored, which are described later, are also connected. Note that the system control circuit 201 comprises a multi-core CPU capable of parallel processing of a plurality of tasks, a RAM, and a ROM, and controls each unit of the camera body 101 and the image capturing lens 102.

Below, using FIG. 1 and FIG. 2, the configuration of each unit of the digital single lens reflex camera 100 will be described. The image capturing lens 102 can be replaced, and the camera body 101 and the image capturing lens 102 are electrically connected via the mount contact point group 115. In the image capturing lens 102, a focusing lens 113 and an aperture shutter 114 are arranged, and configuration is such that it is possible to adjust the amount of light taken into the camera and the focus by control via the mount contact point group 115.

The quick return mirror 103 comprises a main mirror 103a and a sub mirror 103b. The main mirror 103a is configured by a half-mirror. The main mirror 103a is installed diagonally on an image capturing optical path in a finder observation state, and reflects an incident light beam from the image capturing lens 102 towards a viewfinder optical system. Meanwhile, transmitted light enters the focus detection sensor 105 via the sub mirror 103b.

The focus detection sensor 105 has a focal point detection line sensor arranged in a secondary image forming plane of the image capturing lens 102, and generates an AF signal (auto focusing control signal) that represents a focus state of the image capturing lens 102 in accordance with a phase difference detection method. The generated AF signal is transmitted to the system control circuit 201, and the system control circuit 201 detects the focus state of a focusing lens 113 based on an AF signal. Furthermore, the system control circuit 201 performs focal point adjustment by controlling driving of the focusing lens 113 based on the result of the focus detection.

A focusing screen 106 is arranged on a planned image forming plane of the image capturing lens 102 in the viewfinder optical system. The light path of light that passes through the focusing screen 106 is changed by a pentaprism 107, and the light is guided to an eyepiece 109. The photographer can confirm the image capture plane and photographic information by observing the focusing screen 106 via the eyepiece 109.

The photometric sensor 108 is arranged to the side of the eyepiece 109. The photometric sensor 108 photoelectrically converts irradiated light to generate image data having a luminance signal and a color difference signal. The photometric sensor 108 also generates an AE signal (automatic exposure control signal) based on the generated image data, and transmits the AE signal to the system control circuit 201. The system control circuit 201 performs exposure control using the received AE signal. Also, in the subject detection circuit 204, subject detection is performed based on the AE signal. The system control circuit 201 optimizes focal point adjustment and exposure control based on the photographic subject detected in the subject detection circuit 204.

Behind the quick return mirror 103, the focal plane shutter 110 and the image-capturing element 111 are arranged. When exposure is performed, the main mirror 103a and the sub mirror 103b are retracted from the image capturing optical path, and by the focal plane shutter 110 opening, the image-capturing element 111 is exposed. When capturing is not performed, the focal plane shutter 110 blocks the image-capturing element 111, and when capturing, the focal plane shutter 110 opens and guides a light beam from the photographic subject to the image-capturing element 111.

The image-capturing element 111 is configured by a CCD, a CMOS sensor, or the like, and includes an infrared cut-off filter, a low pass filter, or the like. The image-capturing element 111 photoelectrically converts an image of the photographic subject that was formed by passing through the imaging optical system of the image capturing lens 102, generates an image signal, and transmits the image signal to the system control circuit 201. The system control circuit 201 generates image data from a received image signal, and both saves the image data into the memory 202 and displays the image data on the display apparatus 112, which is an LCD or the like.

The operation component 203 detects a user operation performed via a release button, a switch, a connection device, or the like, (not shown) and transmits a signal according to the content of the operation to the system control circuit 201. When a release button is operated so as to be depressed halfway, a release switch SW1 is turned on, and a capturing preparation operation such as AF (auto focus), AE (automatic exposure control), or the like is performed. Also, when the release button is operated so as to be fully depressed, a release switch SW2 is turned on, and a still image capturing operation is performed. So that a user can confirm the result of capturing, the still image that was captured immediately previously is displayed for a fixed amount of time on the display apparatus 112.

Next, a subject detection operation by the digital single lens reflex camera configured as described above will be described.

(Dictionary Switching in Subject Detection)

In the subject detection circuit 204, a photographic subject is detected in an AE signal as previously described. In the subject detection circuit 204, a processing parameter for detecting a photographic subject by using dictionary data that is stored in the storage 210 and is based on machine learning is determined. There are cases where characteristics of a photographic subject differ depending on the capturing scene. Accordingly, it is possible to enhance photographic subject detection accuracy by preparing dictionary data for each photographic subject characteristic, and using dictionary data matching the scene. In other words, there are a plurality of dictionary data items, and the dictionary data to be used is selected in accordance with the situation.

As illustrated in FIG. 2, the storage 210 stores general-purpose dictionary data 205 and two or more dedicated dictionary data items 206-1 to 206-N (N is an integer greater than or equal to 2) according to photographic subject characteristics. A user may select may select the dictionary data in accordance with their purpose via the operation component 203. Also, the system control circuit 201 may select appropriate dictionary data in accordance with the situation.

Figure 3:
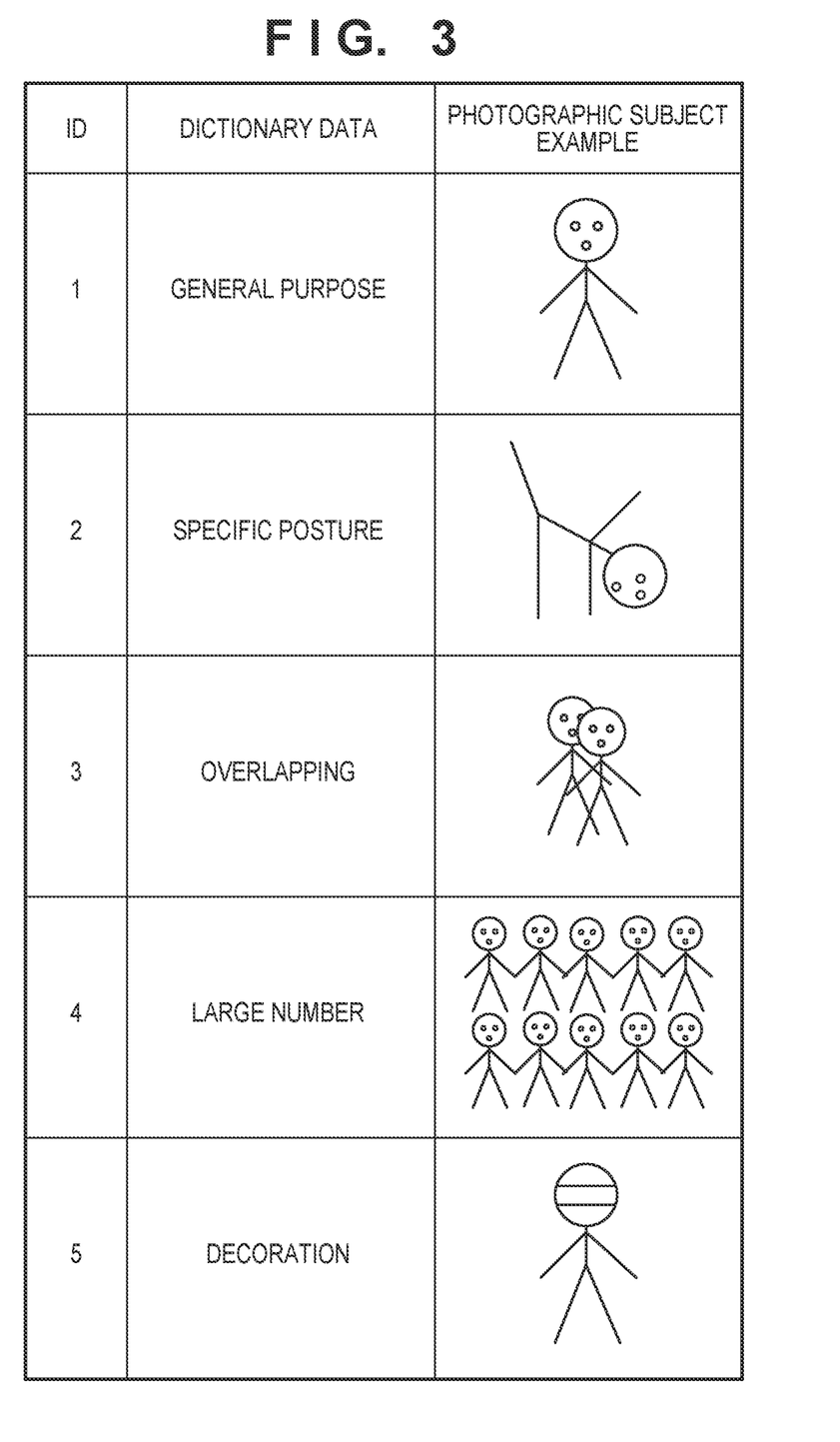
FIG. 3 is a view illustrating an example of dictionary data according to photographic subject characteristics.

Using FIG. 3, an example of dictionary data and photographic subject characteristics will be given. FIG. 3 shows a table in which an ID is recorded in a first column, a definition of dictionary data in a second column, and a photographic subject example in a third column, where the photographic subject is a person. ID 1 is for general purpose dictionary data, and is for dictionary data acquired by machine learning from typical photographic subject image data for a person and supervisory data. ID 2 to ID 5 are for dedicated dictionary data, and are for dictionary data that is learned so as to be specialized to a specific state for a person. Dedicated dictionary data can be said to be dictionary data that is divided by at least one of, for example, a posture of a photographic subject, the number of photographic subjects, overlapping of photographic subjects, and the existence/absence or type of a decoration corresponding to a photographic subject. ID 2 indicates a state of a specific posture of a photographic subject that is a person, ID 3 indicates a state in which there is overlapping of photographic subjects that are people, ID 4 indicates a state in which there are a large number of photographic subjects who are people, and ID 5 indicates a state in which there is a decoration on the head or the like of a photographic subject who is a person. In other words, ID 1 through ID 5 are all dictionary data for detecting the same specific photographic subject (a person in this case). If ID 2 through ID 4 are used and if the photographic subject satisfies respectively corresponding specific conditions, it is possible to detect the photographic subject at a higher probability than with the general purpose dictionary data of ID 1, and on the contrary, if the specific conditions are not satisfied, the probability of being able to detect the photographic subject becomes lower than with the general purpose dictionary data of ID 1. If the general purpose dictionary data of ID 1 is used, it is possible to detect a photographic subject under multiple conditions or under more conditions than with the respective dedicated dictionary data items, but under a condition corresponding to any of ID 2 through ID 4, the probability that a photographic subject can be detected becomes lower than with the dictionary data of the respective one of ID 2 through ID 4. Note that the photographic subject is described as a person here, but there is no limitation to this, and the detection target may be a part of a person (for example, the head), a specific individual, a specific animal, a specific object, or a specific scene, or the like.

It becomes possible to perform high-accuracy subject detection by setting appropriate dictionary data in accordance with a characteristic of a photographic subject in a capturing scene. However, while detection accuracy is high for a specific photographic subject with dedicated dictionary data, generalizability is lost. For this reason, in the case where a specific characteristic of a photographic subject occurs during capturing, there are cases where detection accuracy is lower for dedicated dictionary data than for general purpose dictionary data. Accordingly, in the case where the set dictionary data is dedicated dictionary data and a detection evaluation value is low, multiple dictionary data items are used, for example both the general purpose dictionary data and the set dedicated dictionary data are used. For example, by using general purpose dictionary data and dedicated dictionary data alternatingly, it is possible to avoid a situation in which the detection accuracy is continuously low.

(Flow of Image Capturing Apparatus Processing)

Figure 4:
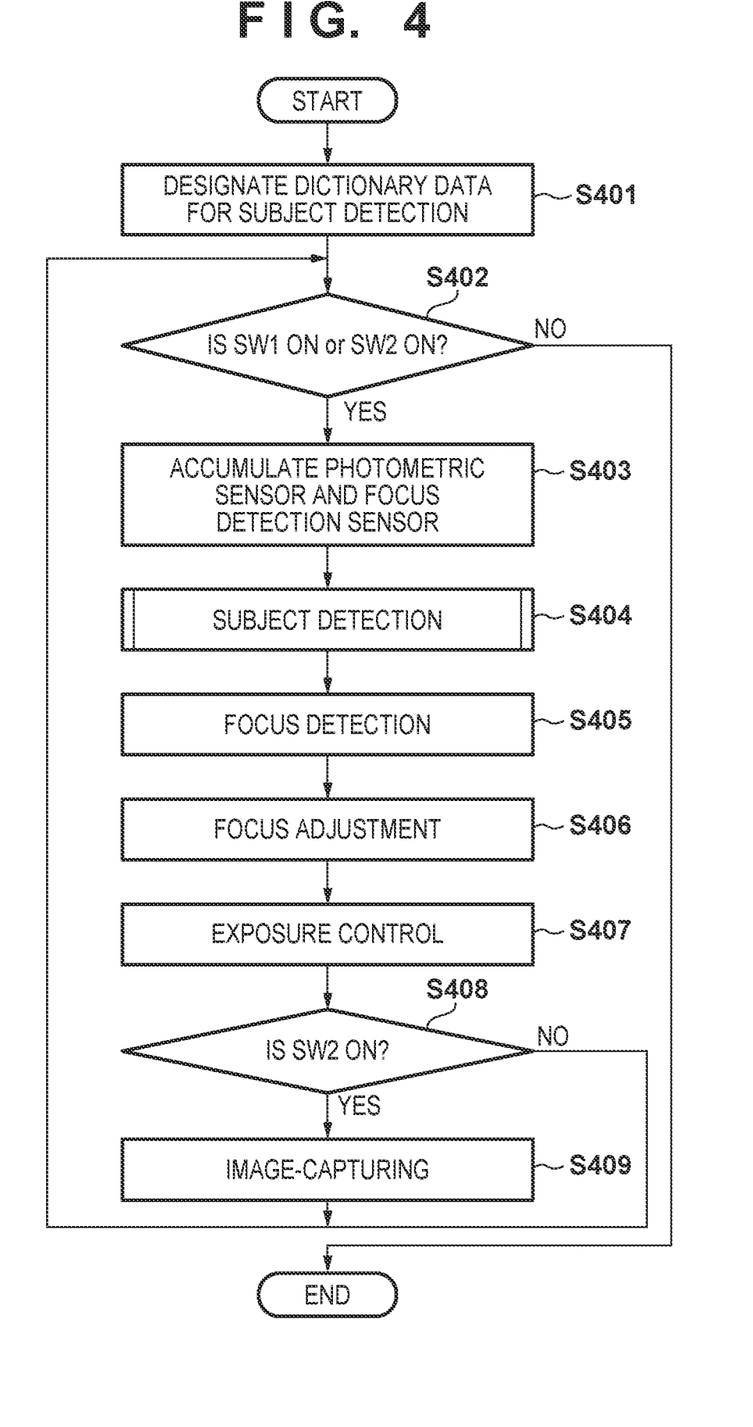
FIG. 4 is a flowchart illustrating a procedure of an image capturing operation of the digital single lens reflex camera.
Figure 5:
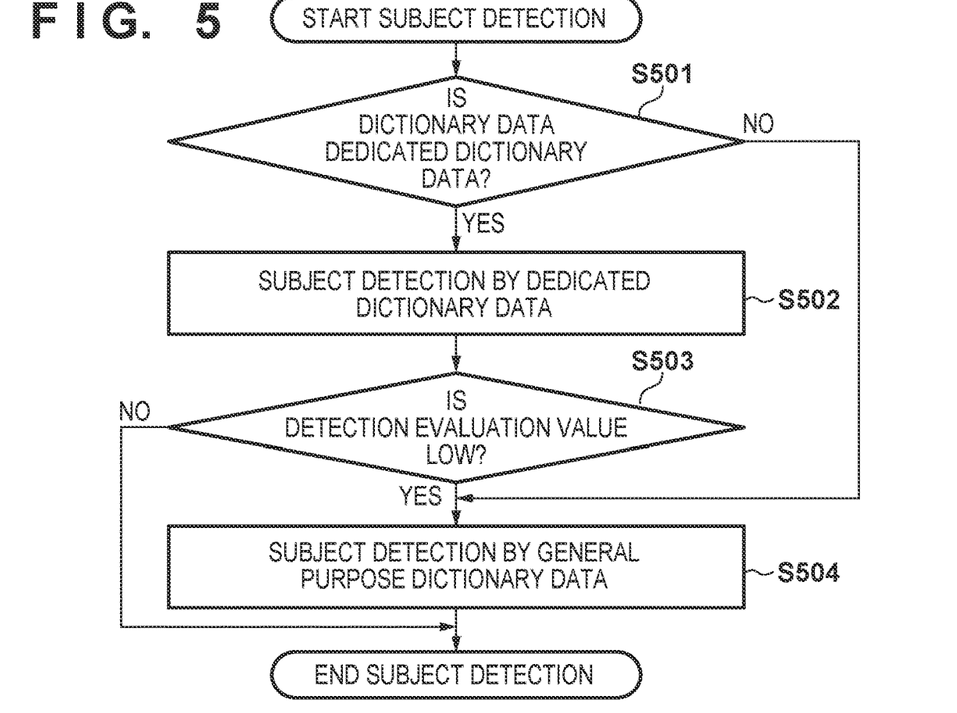
FIG. 5 is a flowchart illustrating a procedure for subject detection of the digital single lens reflex camera.

Next, with reference to FIG. 4 and FIG. 5, an image capturing operation of a digital single lens reflex camera of the foregoing configuration will be described. FIG. 4 is a flowchart indicating a procedure of an image capturing operation of the digital single lens reflex camera 100. The operation of this flowchart is realized by the system control circuit 201 loading a program stored in ROM into RAM and executing the program.

In step S401, via the operation component 203, dictionary data is set to the subject detection circuit 204 by a user. One of the general purpose dictionary data 205 and the dedicated dictionary data items 206-1 to 206-N is set. In the case where there is no setting by a user, an initial setting is made to be the general purpose dictionary data 205. Note that here, the sequence of processing from step S402 to step S409 below is processing that corresponds to one frame of a camera.

In step S402, the system control circuit 201 detects the state of the release switch SW1 and the release switch SW2, and if either is on, the frame is advanced by one and the processing advances to step S403. If both the release switches SW1 and SW2 are off, the processing is ended.

In step S403, the system control circuit 201 causes the photometric sensor 108 to accumulate charge, and a generated image signal is read out as an AE signal. Also, the system control circuit 201 causes the focus detection sensor 105 to accumulate charge, and a generated image signal is read out as an AF signal.

In step S404, the subject detection circuit 204 performs subject detection using the AE signal read out in step S403 as an input image. Details of the processing of the subject detection will be described later. In step S405, the system control circuit 201 selects the closest focus detection region to the position of the photographic subject detected in step S404, and using the AF signal obtained in step S403, detects the focus state of the selected focus detection region. Note that in the case where no photographic subject is detected in step S404, after having performed focus detection of all focus detection regions, a focus detection region for which there is a focal point at a position closest to the camera is selected.

In step S406, the system control circuit 201 adjusts the focal position of the focusing lens 113 based on the focus state of the focus detection region selected in step S405. In step S407, the system control circuit 201 performs automatic exposure control by a publicly known method that uses the AE signal read out in step S403, and determines an aperture value (AV value), a shutter speed (TV value), and an ISO sensitivity (ISO value). The AV value, the TV value, and the ISO value here are determined using an exposure chart stored in advance.

In step S408, the system control circuit 201 detects the state of the release switch SW2, and if the release switch SW2 is on, the processing advances to step S409. Meanwhile, if the release switch SW2 is off, the processing returns to step S402.

In step S409, the system control circuit 201 raises the main mirror 103a and the sub mirror 103b to retract them from the light path, and thereby causes the image-capturing element 111 to be exposed. The exposed image-capturing element 111 generates an image signal, and transmits the image signal to the system control circuit 201. Then, the system control circuit 201 generates image data based on the image signal received from the image-capturing element 111, and in addition to saving the image data in the memory 202, displays the image data on the display apparatus 112. The above is an operational sequence of the digital single lens reflex camera in the present embodiment.

(Flow of Processing for Subject Detection)

Next, with reference to FIG. 5, the flow of processing for the subject detection in step S404 of FIG. 4 will be described.

In step S501, the system control circuit 201 determines the type of the dictionary data used in the subject detection circuit 204. If the dictionary data is the general purpose dictionary data 205 (NO is determined in step S501), the processing advances to step S504. In step S504, the subject detection circuit 204, based on the general purpose dictionary data, performs subject detection using the image signal by a later-described CNN method. If the dictionary data is any of the dedicated dictionary data items 206-1 to 206-N (YES is determined in step S501), the processing advances to step S502.

In step S502, the subject detection circuit 204 performs subject detection using the image signal based on the set dedicated dictionary data. Next, in step S503, the system control circuit 201 determines whether or not a detection evaluation value for the photographic subject detected in step S502 is lower than a predetermined value. If the detection evaluation value is greater than or equal to the predetermined value (NO is determined in step S503), it is determined that the target photographic subject can be detected, and the detection processing is ended. If the detection evaluation value is lower than the predetermined value (YES is determined in step S503), it is determined that the target photographic subject cannot be detected. In such a case, there is a possibility that a specific situation occurs, and a state that is unfavorable for detection by the dedicated dictionary which has low generalizability is fallen into. Accordingly, in step S504, the subject detection circuit 204 is caused to execute the photographic subject detection processing again using the general purpose dictionary data. The result of that is made to be the subject detection result, and processing is ended.

In the description above, if the evaluation value for subject detection according to dedicated dictionary data is low, subject detection using general purpose dictionary data is performed. In such a case, subject detection ends up being performed twice for each frame, the processing load increases, and a delay in image capturing processing becomes larger. Accordingly, a method of performing processing by switching between the dedicated dictionary data and the general purpose dictionary data temporally, if the evaluation value for subject detection by dedicated dictionary data is low can be considered. In such a case, the number of detections for one frame is one, and so delay in image capturing processing does not becomes larger. In the method of processing while switching the dedicated dictionary data and the general purpose dictionary data, when the dedicated dictionary data detection evaluation value becomes higher, detection processing in which only dedicated dictionary data is used is transitioned into. Thereby, even if a specific situation unfavorable for dedicated dictionary data temporarily occurs, it is possible to return to detection processing that makes use of characteristics of the dedicated dictionary.

Figure 6:
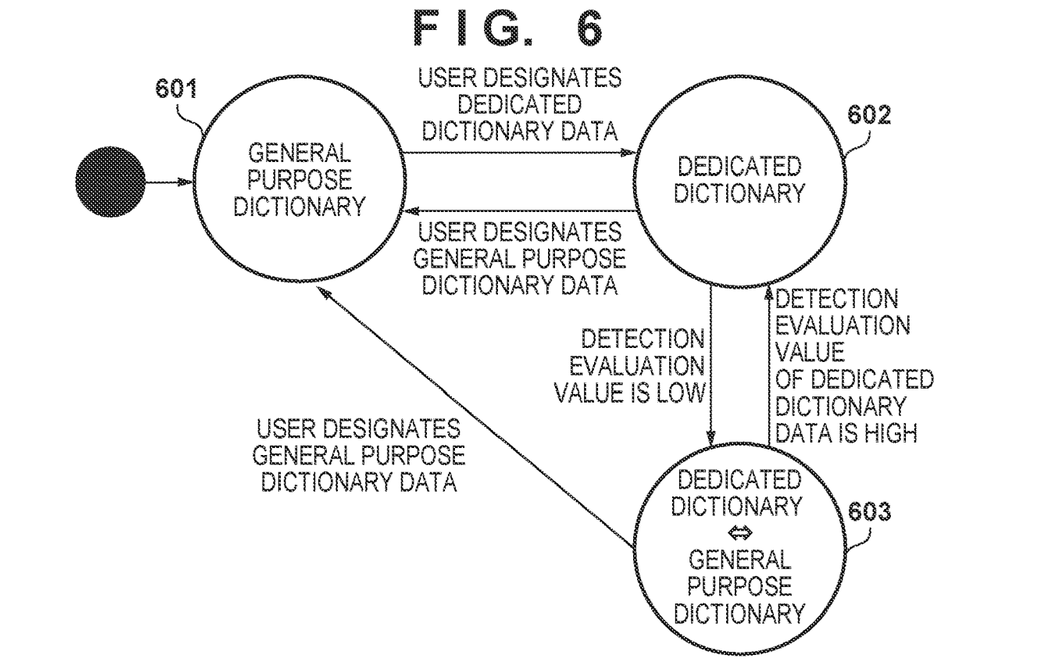
FIG. 6 is a state transition diagram for dictionary data used in subject detection.

The usage status of the dictionary data of the subject detection circuit 204 described above is described using a state transition diagram of FIG. 6. States 601, 602, and 603 indicate dictionary data use states, and the state 601 indicates a state in which general purpose dictionary data is used, the state 602 indicates a state in which dedicated dictionary data is used, and the state 603 indicates a state in which the dedicated dictionary data and the general purpose dictionary data are used alternatingly. The state 601 is an initial state, and arrow symbols between the states indicate conditions for state transitions. In state 601, if the user designates dedicated dictionary data via the operation component 203, the state 602 is transitioned into. In state 602, if the user designates general purpose dictionary data via the operation component 203, the state 601 is transitioned into. Also, in the state 602, if the evaluation value for subject detection according to dedicated dictionary data is low, the state 603 is transitioned into. In state 603, if the user designates general purpose dictionary data via the operation component 203, the state 601 is transitioned into. Also, in the state 603, if the evaluation value for subject detection according to dedicated dictionary data is high, the state 602 is transitioned into. Processing for subject detection is performed according to the above state transitions.

Here, when dedicated dictionary data is selected, general purpose dictionary data is used in a case where the evaluation value for subject detection is low, but description will be given for the reason why not to use dedicated dictionary data even if the evaluation value for subject detection is low when the general purpose dictionary data has been selected. Regardless of whether the user selected dedicated dictionary data, it is thought that in a case where the evaluation value of the subject detection is low, there is a high possibility that the photographic subject that is the target of detection is not in a condition corresponding to the selected dedicated dictionary data. For that reason, it is possible to increase the probability that the photographic subject will be detected by using general purpose dictionary data in order to detect a photographic subject that is in a condition that does not correspond to the dedicated dictionary data. On the contrary, the fact that the user has not selected dedicated dictionary data is thought to mean that there is a high probability that the photographic subject who is the target of detection will not be in the condition corresponding to the dedicated dictionary data. Accordingly, even if the evaluation value for subject detection in the case of using general purpose dictionary data is low, it cannot be expected that the probability of detecting a photographic subject will increase if the dedicated dictionary data is used. Accordingly, when general purpose dictionary data is selected, even if the evaluation value for subject detection is low, a state in which the dedicated dictionary data is used is not transitioned into.

(Detailed Description of CNN)

Figure 7:
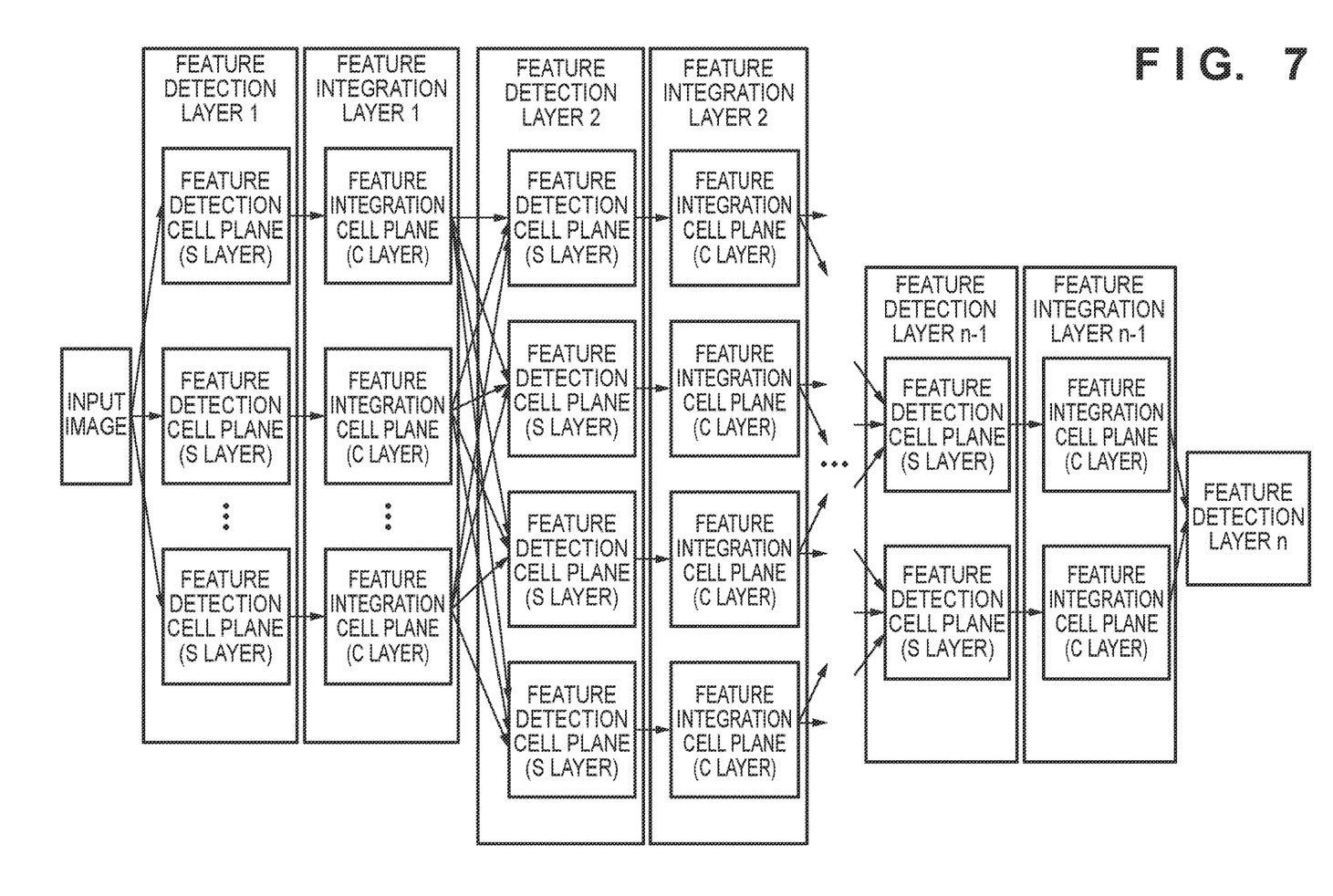
FIG. 7 is a schematic drawing illustrating an example of an overall configuration of a CNN.

In the present embodiment, the subject detection circuit 204 is configured by a CNN (convolutional neural network). The basic configuration of a CNN will be described using FIG. 7 and FIG. 8. FIG. 7 illustrates the basic configuration of a CNN for detecting subjects from two-dimensional image data that is input. Processing flows in the following manner; input is at the left end and processing advances toward the right. The CNN is configured such that sets each consisting of two layers, one of which is referred to as a feature detection layer (S layer) and the other of which referred to as a feature integration layer (C layer), are hierarchically-arranged.

In the CNN, subsequent features are first detected in the S layer based on features detected in the previous level. Further, the CNN has a configuration in which the features detected in the S layer are integrated in the C layer, and are transmitted to the next level as detection results in the present level.

The S layer is constituted of feature detection cell planes, and each feature detection cell plane detects a different feature. Further, the C layer is constituted of feature integration cell planes, and performs pooling or sub-sampling of the results of detection at the feature detection cell planes of the previous level. In the following, the feature detection cell planes and the feature integration cell planes are collectively referred to as feature planes where it is not particularly necessary to make a distinction therebetween. In the present embodiment, configuration is such that the C layer is not used and only the S layer is used in the output layer which is the final layer.

Figure 8:
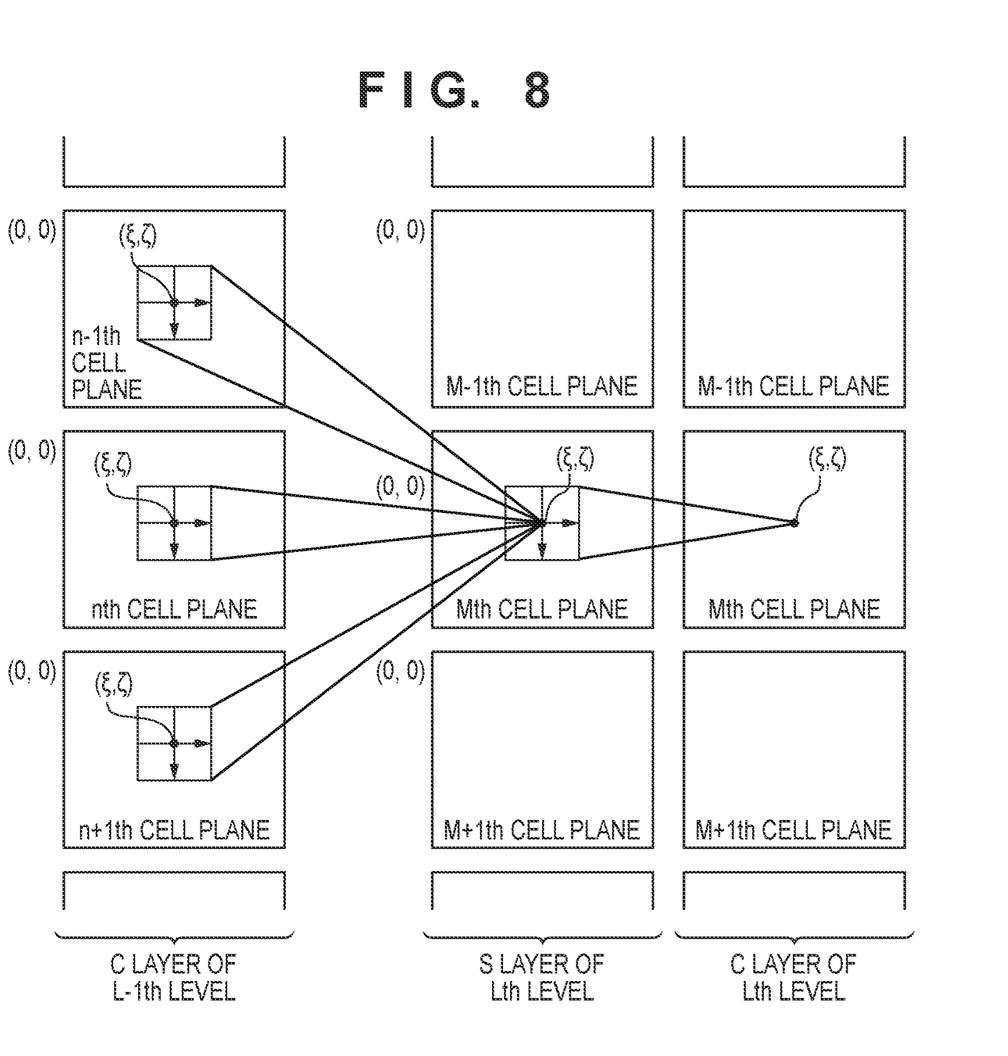
FIG. 8 is a schematic drawing illustrating an example of a partial configuration of a CNN.

Details of the feature detection processing in a feature detection cell plane and feature integration processing in the feature integration cell plane are described using FIG. 8. A feature detection cell plane is configured by a plurality of feature detection neurons, and the feature detection neurons are connected to the C layer of the previous level in a predetermined structure. Further, one feature integration cell plane is constituted of a plurality of feature integration neurons, and the individual feature integration neurons are connected to the S layer of the same level in a predetermined structure. The output value of a feature detection neuron at a position $(\xi,\zeta)$ in an Mth cell plane in the S layer of the Lth level, illustrated in FIG. 8, is denoted as $y^{LS}_M(\xi,\zeta)$ and the output value of a feature integration neuron at the position $(\xi,\zeta)$ in an Mth cell plane in the C layer of the Lth level is denoted as $y^{LC}_M(\xi,\zeta)$ In this case, when the connection coefficients of the respective neurons are defined as $w^{LS}_M(n,u,v)$ and $w^{LC}_M(u,v)$, the respective output values can be expressed as follows.

$$y^{LS}_M(\xi, \zeta) \equiv f(u^{LS}_M(\xi, \zeta)) \equiv f\left\{\sum_{n,u,v} w^{LS}_M(n, u, v) \cdot y^{L-1C}_n(\xi + u, \zeta + v)\right\} \quad (1)$$

$$y^{LC}_M(\xi, \zeta) \equiv u^{LC}_M(\xi, \zeta) \equiv \sum_{u,v} w^{LC}_M(u, v) \cdot y^{LC}_M(\xi + u, \zeta + v) \quad (2)$$

Here, the "f" in Formula (1) is an activation function, and for example is a sigmoid function such as a hyperbolic tangent function or a logistic function. Further, $u^{LS}_M(\xi,\zeta)$ indicates the internal state of the feature detection neuron at the position $(\xi, \zeta)$ in the Mth cell plane of the S layer of the Lth level. No activation function is used in Formula (2), and Formula (2) is expressed as a simple linear sum. If no activation function is used as in Formula (2), the internal state $u^{LC}_M(\xi,\zeta)$ of the neuron and the output value $y^{LC}_M(\xi,\zeta)$ of the neuron are equal. Further, $y^{L-1C}_n(\xi+u,\zeta+v)$ in Formula (1) is referred to as a connection destination output value of the feature detection neuron, and $y^{LS}_M(\xi+u,\zeta+v)$ in Formula (2) is referred to as a connection destination output value of the feature integration neuron.

Here, "$\xi$", "$\zeta$", "u", "v", and "n" in Formula (1) and Formula (2) are described. The position $(\xi, \zeta)$ corresponds to position coordinates in the input image, and if the output value $y^{LS}_M(\xi,\zeta)$ is large, for example, this indicates that the possibility is high that the feature detected by the Mth cell plane of the S layer of the Lth level is present at the pixel position (ξ, ζ) in the input image. Further, "n" in Formula (1) indicates the nth cell plane of the C layer of the L−1th level, and is referred to as an integration destination feature number. Basically, a product-sum operation is performed for every cell plane present in the C layer of the L−1th level. "(u, v)" are relative position coordinates of the connection coefficient, and the product-sum operation is performed within a finite range of (u, v) in accordance with the size of the feature to be detected. This finite range of (u, v) is referred to as a receptive field. Further, the size of the receptive field is referred to as a receptive field size in the following, and is expressed by the number of horizontal pixels times the number of vertical pixels in a connected range.

Further, if L=1 in Formula (1), or that is, for the S layer of the initial level, $y^{L-1C}_n(ξ+u,ζ+v)$ in Formula (1) is the input image $y^{in-image}(ξ+u,ζ+v)$ Also, neurons and pixels are discretely distributed, and the connection destination feature numbers are also discrete, and therefore, "ξ", "ζ", "u", "v", and "n" are not sequential variables and take discrete values. Here, "ξ" and "ζ" are nonnegative integers, "n" is a natural number, and "u" and "v" are integers, and these variables each have a finite range.

$w^{LS}_M(n,u,v)$ in Formula (1) is a connection coefficient distribution for detecting a predetermined feature, and the predetermined feature becomes detectable by adjusting this to an appropriate value. The adjustment of this connection coefficient distribution is learning, and in the building of the CNN, various test patterns are provided, and the connection coefficient is adjusted by repetitively and gradually correcting the connection coefficient so that $y^{LS}_M(ξ,ζ)$ becomes an appropriate output value.

Next, a two-dimensional Gaussian function is used for $w^{LC}_M(u,v)$ in Formula (2) which can be expressed as Formula (3) below.

$$w^{LC}_M(u, v) = \frac{1}{2\pi\sigma^2_{L,M}} \cdot \exp\left(-\frac{u^2 + v^2}{2\sigma^2_{L,M}}\right) \quad (3)$$

"(u,v)" also has a finite range here, and the range is referred to as a receptive field and the size of the range is referred to as a receptive field size, similarly to the case of the feature detection neuron. Here, the value of the receptive field size can be set as appropriate in accordance with the size of the Mth feature of the S layer of the Lth level. "σ" in Formula (3) indicates a feature size factor, and may be a constant that can be set as appropriate in accordance with the receptive field size. Specifically, the outermost value of the receptive field may be set to a value that can be regarded as substantially zero. What performs the above-described operation in each level and to thereby perform subject detection at the S layer of the final level is the configuration of the CNN in the present embodiment.

(CNN Learning Method)

A specific method for adjusting the connection coefficient $w^{LS}_M(n,u,v)$ is described. A method for adjusting the connection coefficient, in other words learning, is described. In the learning, a neuron output value is obtained by actually providing test patterns, and correction of the connection coefficient $w^{LS}_M(n,u,v)$ is performed based on the relation between the output value and a supervisory signal (a desirable output value that the neuron should output). In the learning of the present embodiment, the final feature detection layer corrects a connection coefficient by using a least squares method, and corrects an intermediate feature detection layer by using backpropagation. Details of the methods of correcting the connection coefficient such as the least squares method and backpropagation are described in D1, and so detailed description thereof is omitted.

A large number of specific patterns to be detected and patterns not to be detected are prepared as test patterns for learning. Each test pattern includes an image signal and a supervisory signal as one set. When a specific pattern to be detected is provided, a supervisory signal is given such that, in the final feature detection cell plane, the output in relation to a neuron for a region in which the specific pattern is present equals "1". Conversely, when a pattern not to be detected is provided, the supervisory signal is given such that the output in relation to a neuron for a region of that pattern equals "−1".

As described above, by virtue of the present embodiment, by using dictionary data according to the photographic subject characteristics, it is possible to improve the accuracy in subject detection and to suppress the possibility of degrading detection accuracy in specific situations.

Note that in the above embodiments, description is such that by switching the dictionary data, the detection processing parameter acquired by machine learning (in other words the connection coefficient $w^{LS}_M(n,u,v)$) is switched. The present invention is not limited to this, and may also switch the network configuration of the CNN in accordance with switching the dictionary data. Changing the network configuration of the CNN means changing the number of feature detection layers, the size of receptive fields for each layer, the type of activation function, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-126359, filed Jul. 2, 2018 which is hereby incorporated by reference herein in its entirety.

What is claimed is:

1. An image processing apparatus comprising:
at least one processor or circuit configured to function as the following units:
an analysis unit configured to select one among a plurality of dictionary data items, and by using the selected dictionary data, to perform analysis of an obtained image,
wherein the plurality of dictionary data items includes at least a first dictionary data and a second dictionary data, and
wherein the analysis unit, even in a case where a detection score for the photographic subject obtained using the first dictionary data is lower than a threshold or the photographic subject cannot be detected using the first dictionary data, performs image analysis again by using the first dictionary data, and
in a case where a detection score for the photographic subject obtained using the second dictionary data is lower than a threshold or the photographic subject cannot be detected using the second dictionary data, performs image analysis again by using dictionary data different from the second dictionary data,
wherein the second dictionary data is a dedicated dictionary data, with which a probability to detect a target photographic subject is higher than with a general purpose dictionary data, and wherein the dictionary data different from the second dictionary is the general purpose dictionary data, by which it is possible to detect the target photographic subject in more conditions than with the dedicated dictionary data.

2. The image processing apparatus according to claim 1, wherein
the dictionary data different from the second dictionary data is the first dictionary data.

3. The image processing apparatus according to claim 1, wherein
the analysis unit, by using set dictionary data, detects a photographic subject included in the obtained image.

4. The image processing apparatus according to claim 1, wherein
the analysis unit, based on an instruction by a user, selects one dictionary data item.

5. The image processing apparatus according to claim 1, wherein
the analysis unit, in a case where a detection score for the photographic subject obtained using the second dictionary data is lower than a threshold or the photographic subject cannot be detected using the second dictionary data, performs image analysis again by using the dictionary data different from the first dictionary data and the second dictionary data.

6. The image processing apparatus according to claim 1, wherein
the first dictionary data is the general purpose dictionary data about the photographic subject and the second dictionary data is the dedicated dictionary data that is organized by at least one of a posture of a photographic subject, a number of photographic subjects, overlapping of photographic subjects, and the existence, absence of a decoration on a photographic subject.

7. The image processing apparatus according to claim 1, wherein
the dictionary data is dictionary data acquired by machine learning.

8. An image processing apparatus comprising:
at least one processor or circuit configured to function as the following units:
a detection unit configured to, by referencing dictionary data acquired by machine learning corresponding to a target photographic subject to be detected in an obtained image, detect the target photographic subject;
a selection unit configured to select one of a plurality of dictionary data items corresponding to the target photographic subject; and
a control unit configured to, in a case where a detection evaluation value, in a case where the photographic subject is detected by using the dictionary data selected by the selection unit, is lower than a predetermined value, control the detection unit to detect the target photographic subject by using the selected dictionary data and dictionary data different from the selected dictionary data,
wherein the plurality of dictionary data items include a general purpose dictionary data and a plurality of dedicated dictionary data items, and
each of the plurality of dedicated dictionary data items are dictionary data for which, in a case where the target photographic subject is in a condition respectively corresponding to the dedicated dictionary data, a probability that it is possible to detect the target photographic subject is higher than with the general purpose dictionary data, and the general purpose dictionary data is dictionary data by which it is possible to detect the target photographic subject in more conditions than with each of the plurality of dedicated dictionary data items,
wherein the dictionary data different from the selected dictionary data is a general purpose dictionary data, by which it is possible to detect the target photographic subject in more conditions than with a dedicated dictionary data.

9. The image processing apparatus according to claim 8, wherein the dictionary data is data that defines a detection processing parameter acquired by machine learning.

10. The image processing apparatus according to claim 8, wherein the selection unit selects one of the plurality of dedicated dictionary data items.

11. The image processing apparatus according to claim 10, wherein the control unit, in a case where the detection evaluation value, in the case where the photographic subject is detected by using the one of the plurality of dedicated dictionary data items selected by the selection unit, is lower than a predetermined value, controls the detection unit to detect the target photographic subject by using the selected dedicated dictionary data and also by using the general purpose dictionary data alternatively with the dedicated dictionary data items for the same photographic subject detection.

12. The image processing apparatus according to claim 11, wherein the control unit controls the detection unit so as to use the selected dedicated dictionary data and general purpose dictionary data alternatingly for each one frame.

13. The image processing apparatus according to claim 11, wherein the control unit, in a case where the detection evaluation value, in a case where the photographic subject is detected by using the general purpose dictionary data is less than a predetermined value, controls the detection unit to detect the target photographic subject without using any of the plurality of dedicated dictionary data items, and by using the general purpose dictionary data.

14. The image processing apparatus according to claim 8, wherein the dedicated dictionary data is dictionary data-that is organized by at least one of a posture of a photographic subject, a number of photographic subjects, overlapping of photographic subjects, and the existence, absence of a decoration on a photographic subject.

15. The image processing apparatus according to claim 8, wherein the control unit, in a case where a detection evaluation value, in a case where the photographic subject is detected by using dictionary data selected by the selection unit, is greater than or equal to a predetermined value, controls the detection unit to detect the target photographic subject by using the selected dictionary data.

16. An image processing method comprising:
    selecting one among a plurality of dictionary data items, and by using the selected dictionary data, performing analysis of an obtained image,
    wherein the plurality of dictionary data items includes at least a first dictionary data and a second dictionary data, and
    even in a case where a detection score for the photographic subject obtained using the first dictionary data is lower than a threshold or the photographic subject cannot be detected using the first dictionary data, image analysis is performed again by using the first dictionary data, and
    in a case where a detection score for the photographic subject obtained using the second dictionary data is lower than a threshold or the photographic subject cannot be detected using the second dictionary data, image analysis is performed again by using dictionary data different from the second dictionary data,
    wherein the second dictionary data is a dedicated dictionary data, with which a probability to detect a target photographic subject is higher than with a general purpose dictionary data, and wherein the dictionary data different from the second dictionary is the general purpose dictionary data, by which it is possible to detect the target photographic subject in more conditions than with the dedicated dictionary data.

17. An image processing method comprising:
    detecting a target photographic subject by referencing dictionary data acquired by machine learning corresponding to the target photographic subject to be detected in an obtained image;
    selecting one of a plurality of dictionary data items corresponding to the target photographic subject; and
    in a case where a detection evaluation value, in a case where the photographic subject is detected by using the dictionary data selected by the selecting, is lower than a predetermined value, controlling the detecting to detect the target photographic subject by using the selected dictionary data and dictionary data different from the selected dictionary data,
    wherein the plurality of dictionary data items include general purpose dictionary data and a plurality of dedicated dictionary data items, and
    each of the plurality of dedicated dictionary data items is dictionary data for which, in a case where the target photographic subject is in a condition respectively corresponding to the dedicated dictionary data, a probability that it is possible to detect the target photographic subject is higher than with the general purpose dictionary data, and the general purpose dictionary data is dictionary data by which it is possible to detect the target photographic subject in more conditions than with each of the plurality of dedicated dictionary data items,
    wherein the dictionary data selected by the selecting is a dedicated dictionary data, with which a probability to detect a target photographic subject is higher than with a general purpose dictionary data, and wherein the dictionary data different from the selected dictionary is the general purpose dictionary data, by which it is possible to detect the target photographic subject in more conditions than with the dedicated dictionary data.

18. A non-transitory computer-readable storage medium on which a program for enabling a computer to function as each unit of an image processing apparatus is stored, the image processing apparatus comprising:
    at least one processor or circuit configured to function as the following units:
    an analysis unit configured to select one among a plurality of dictionary data items, and by using the selected dictionary data, to perform analysis of an obtained image,
    wherein the plurality of dictionary data items includes at least a first dictionary data and a second dictionary data, and
    the analysis unit,
    even in a case where a detection score for the photographic subject obtained using the first dictionary data is lower than a threshold or the photographic subject cannot be detected using the first dictionary data, performs image analysis again by using the first dictionary data, and
    in a case where a detection score for the photographic subject obtained using the second dictionary data is lower than a threshold or the photographic subject cannot be detected using the second dictionary data, performs image analysis again by using dictionary data different from the second dictionary data,
    wherein the second dictionary data is a dedicated dictionary data, with which a probability to detect a target photographic subject is higher than with a general purpose dictionary data, and wherein the dictionary data different from the second dictionary is the general purpose dictionary data, by which it is possible to detect the target photographic subject in more conditions than with the dedicated dictionary data.

19. A non-transitory computer-readable storage medium on which a program for enabling a computer to function as each unit of an image processing apparatus is stored, the image processing apparatus comprising:
    at least one processor or circuit configured to function as the following units:
    a detection unit configured to, by referencing dictionary data acquired by machine learning corresponding to a target photographic subject to be detected in an obtained image, detect the target photographic subject;
    a selection unit configured to select one of a plurality of dictionary data items corresponding to the target photographic subject; and
    a control unit configured to, in a case where a detection evaluation value, in a case where the photographic subject is detected by using the dictionary data selected by the selection unit, is lower than a predetermined value, control the detection unit to detect the target photographic subject by using the selected dictionary data and dictionary data different from the selected dictionary data, wherein the plurality of dictionary data items include general purpose dictionary data and a plurality of dedicated dictionary data items, and each of the plurality of dedicated dictionary data items are dictionary data for which, in a case where the target photographic subject is in a condition respectively corresponding to the dedicated dictionary data, a probability that it is possible to detect the target photographic subject is higher than with the general purpose dictionary data, and the general purpose dictionary data is dictionary data by which it is possible to detect the target photographic subject in more conditions than with each of the plurality of dedicated dictionary data items, wherein the dictionary data selected by the selecting is a dedicated dictionary data, with which a probability to detect a target photographic subject is higher than with a general purpose dictionary data, and wherein the dictionary data different from the selected dictionary is the general purpose dictionary data, by which it is possible to detect the target photographic subject in more conditions than with the dedicated dictionary data.

\* \* \* \* \*